(12) United States Patent
Nakayama et al.

(10) Patent No.: US 10,465,768 B2
(45) Date of Patent: Nov. 5, 2019

(54) ROTARY AXIS MODULE AND ARTICULATED ROBOT

(71) Applicant: FANUC CORPORATION, Yamanashi (JP)

(72) Inventors: Kazutaka Nakayama, Yamanashi (JP);
Kenichirou Abe, Yamanashi (JP);
Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 15/626,428

(22) Filed: Jun. 19, 2017

(65) Prior Publication Data

US 2018/0038446 A1 Feb. 8, 2018

(30) Foreign Application Priority Data

Aug. 5, 2016 (JP) .................. 2016-155025

(51) Int. Cl.
| | |
|---|---|
| *F16H 1/20* | (2006.01) |
| *B25J 9/10* | (2006.01) |
| *B25J 17/02* | (2006.01) |
| *F16H 37/04* | (2006.01) |

(52) U.S. Cl.
CPC .............. *F16H 1/20* (2013.01); *B25J 9/102* (2013.01); *B25J 17/0241* (2013.01); *F16H 37/041* (2013.01); *Y10S 901/25* (2013.01); *Y10S 901/29* (2013.01)

(58) Field of Classification Search
CPC . F16H 1/20; F16H 37/041; B25J 9/102; B25J 17/0241
See application file for complete search history.

(56) References Cited

U.S. PATENT DOCUMENTS

| | | | | | |
|---|---|---|---|---|---|
| 4,561,816 | A | * | 12/1985 | Dingess | B23K 9/0288 165/11.1 |
| 5,523,662 | A | * | 6/1996 | Goldenberg | B25J 9/06 318/568.11 |
| 6,084,373 | A | * | 7/2000 | Goldenberg | B25J 9/08 318/568.11 |
| 7,013,750 | B1 | | 3/2006 | Kazami | |
| 8,175,747 | B2 | * | 5/2012 | Lee | A63H 11/00 318/568.11 |

(Continued)

FOREIGN PATENT DOCUMENTS

| | | |
|---|---|---|
| CN | 2729288 Y | 9/2005 |
| CN | 102588514 A | 7/2012 |

(Continued)

OTHER PUBLICATIONS

English Abstract for International Publication No. 01/62448 A1, published Aug. 30, 2001, 2 pgs.

(Continued)

*Primary Examiner* — David M Fenstermacher
(74) *Attorney, Agent, or Firm* — Fredrikson & Byron, P.A.

(57) ABSTRACT

A rotary axis module includes: an input shaft connected to a drive motor; an output shaft, an output shaft flange connected to the output shaft; parallel gears coupled to the output shaft flange; at least two double gears; and a transfer gear that transmits the power of the drive motor to the double gears. The at least two double gears and the transfer gear are disposed so as to surround the output shaft.

14 Claims, 13 Drawing Sheets

(56) References Cited

U.S. PATENT DOCUMENTS

| | | | | |
|---|---|---|---|---|
| 8,291,789 B2 * | 10/2012 | Long | ................. | B25J 9/102 |
| | | | | 74/490.01 |
| 8,573,919 B2 * | 11/2013 | Gilchrist | ................. | B25J 9/042 |
| | | | | 414/744.5 |
| 9,827,682 B2 * | 11/2017 | Adachi | ................. | B25J 9/108 |
| D847,238 S * | 4/2019 | Kawaguchi | ................. | D15/199 |
| D847,239 S * | 4/2019 | Kawaguchi | ................. | D15/199 |
| D847,240 S * | 4/2019 | Kawaguchi | ................. | D15/199 |
| D847,241 S * | 4/2019 | Kawaguchi | ................. | D15/199 |
| D847,242 S * | 4/2019 | Kawaguchi | ................. | D15/199 |

FOREIGN PATENT DOCUMENTS

| | | |
|---|---|---|
| CN | 103291845 A | 9/2013 |
| CN | 203248619 U | 10/2013 |
| JP | 7110023 A | 4/1995 |
| JP | 9119486 A | 5/1997 |
| JP | 1023711 A | 1/1998 |
| JP | 10169726 A | 6/1998 |
| JP | 200118186 A | 1/2001 |
| JP | 2007292261 A | 11/2007 |
| JP | 2008240746 A | 10/2008 |
| JP | 200979651 A | 4/2009 |
| JP | 2009108976 A | 5/2009 |
| JP | 2009166168 A | 7/2009 |
| JP | 2014612 A | 1/2014 |
| JP | 2015142948 A | 8/2015 |
| WO | 0162448 A1 | 8/2001 |
| WO | 2006085536 A1 | 8/2006 |

OTHER PUBLICATIONS

English Abstract and Machine Translation for Japanese Publication No. JPH10-169726 A, published Jun. 26, 1998, 10 pgs.
English Abstract and Machine Translation for Japanese Publication No. 2009-166168 A, published Jul. 30, 2009, 14 pgs.
English Abstract and Machine Translation for Japanese Publication No. JPH07-110023 A, published Apr. 25, 1995, 7 pgs.
English Abstract and Machine Translation for Japanese Publication No. 2001-018186 A, published Jan. 23, 2001, 16 pgs.
English Abstract and Machine Translation for International Publication No. 2006/085536 A1, published Aug. 17, 2006, 12 pgs.
English Abstract and Machine Translation for Japanese Publication No. 2009-079651 A, published Apr. 16, 2009, 11 pgs.
English Abstract and Machine Translation for Japanese Publication No. 2007-292261 A, published Nov. 8, 2007, 10 pgs.
English Abstract and Machine Translation for Japanese Publication No. 2015-142948 A, published Aug. 6, 2015, 11 pgs.
English Abstract and Machine Translation for Japanese Publication No. 2008-240746 A, published Oct. 9, 2008, 8 pgs.
English Abstract and Machine Translation for Japanese Publication No. JPH10-023711 A, published Jan. 23, 1998, 14 pgs.
English Abstract and Machine Translation for Japanese Publication No. 2009-108976 A, published May 21, 2009, 16 pgs.
English Abstract and Machine Translation for Japanese Publication No. 2014-000612 A, published Jan. 9, 2014, 11 pgs.
English Abstract and Machine Translation for Japanese Publication No. 09-119486 A, published May 6, 1997, 8 pgs.
Untranslated Decision to Grant a Patent mailed by Japan Patent Office (JPO) for Application No. JP 2016-155025, dated Feb. 19, 2019, 3 pgs.
English Machine Translation of Decision to Grant a Patent mailed by Japan Patent Office (JPO) for Application No. JP 2016-155025, dated Feb. 19, 2019, 2 pgs.
Untranslated Notification of Reasons for Refusal mailed by Japan Patent Office (JPO) for Application No. JP 2016-155025, dated Jul. 24, 2018, 8 pgs.
English Machine Translation of Notification of Reasons for Refusal mailed by Japan Patent Office (JPO) for Application No. JP 2016-155025, dated Jul. 24, 2018, 7 pgs.
English Abstract and Machine Translation for Chinese Publication No. 2729288 Y, published Sep. 28, 2005, 4 pgs.
English Abstract and Machine Translation for Chinese Publication No. 102588514 A, published Jul. 18, 2012, 5 pgs.
English Abstract and Machine Translation for Chinese Publication No. 203248619 U, published Oct. 23, 2013, 5 pgs.
English Abstract and Machine Translation for Chinese Publication No. 103291845 A, published Sep. 11, 2013, 5 pgs.

* cited by examiner

CROSS-SECTION A-A

ROTARY AXIS MODULE AND ARTICULATED ROBOT

BACKGROUND OF THE INVENTION

1. Field of the Invention

The present invention relates to a rotary axis module and an articulated robot provided with the rotary axis module.

2. Description of the Related Art

A conventional gear reduction mechanism including multiple gears is used to transmit rotary power to, for example, a robot arm of an industrial robot from an electric motor. A gear reduction mechanism disclosed in Japanese Unexamined Patent Publication (Kokai) No. 9-119486 includes an input gear connected to a rotary power source, e.g., an electric motor, an output gear connected to a rotated member, e.g., a robot arm, and an intermediate gear assembly engaged with the input gear and the output gear. The intermediate gear assembly of Japanese Unexamined Patent Publication (Kokai) No. 9-119486 is mounted on the same mounting surface as the rotary power source and the rotated member.

Moreover, Japanese Unexamined Patent Publication (Kokai) No. 2014-612 discloses a speed reduction mechanism including multiple double spur gears. The double spur gears are linearly arranged between an input gear and an output gear. Thus, when such a speed reduction mechanism is disposed on the end of a robot wrist, the wrist end can be reduced in size in the thickness (height) direction and the width direction.

SUMMARY OF THE INVENTION

In Japanese Unexamined Patent Publication (Kokai) No. 2014-612, however, the double spur gears are linearly arranged by an umbilical member between the input gear and the output gear, thereby increasing the size of the speed reduction mechanism in the direction of arrangement (arm longitudinal direction).

The present invention has been devised under these circumstances. An object of the present invention is to provide a rotary axis module that can be reduced in size.

In order to attain the object, a first aspect provides a rotary axis module including: an input shaft connected to a drive motor; an output shaft; an output shaft flange connected to the output shaft; parallel gears coupled to the output shaft flange; a reduction-drive outer case rotatably supported by the output shaft flange; a double gear train including at least two double gears disposed in the reduction-drive outer case; and a transfer gear that transmits power of the drive motor to the double gear train, wherein the parallel gear is engaged with a pinion of one of the at least two double gears while a gear wheel of the other double gear of the at least two double gears is engaged with the transfer gear, and the at least two double gears and the transfer gear are disposed in a space between an inner surface of the reduction-drive outer case and the output shaft so as to surround the output shaft.

According to a second aspect, in the first aspect, the at least two double gears are each supported by support bearings and a support member, and the support member is fixed to a mounting flange where the drive motor is mounted.

According to a third aspect, in the first or second aspect, the output shaft has a hollow for passage of an umbilical member.

According to a fourth aspect, in any one of the first to third aspects, the parallel gear is an internal gear.

A fifth aspect, in any one of the first to fourth aspects, further includes bearings whose inner surface sides are coupled to the output shaft flange, the bearings being angular back-to-back duplex bearings.

According to a sixth aspect, in any one of the second to fifth aspects, at least one of the support members of the double gears is supported by both of the pinion and the gear wheel.

According to a seventh aspect, in any one of the second to sixth aspects, the support members of the at least two double gears are connected to each other via a reinforcing member.

According to an eighth aspect, in any one of the second to seventh aspects, at least one of the support bearings of the at least two double gears includes a needle bearing.

According to a ninth aspect, in any one of the second to eighth aspects, at least one of the support bearings of the at least two double gears includes a ball bearing.

According to a tenth aspect, in any one of the first to ninth aspects, a reduction ratio between the parallel gear and the pinion of one of the double gears is larger than a reduction ratio between the gear wheel of one of the double gears and the pinion of the other double gear.

According to an eleventh aspect, in any one of the first to tenth aspects, the at least two double gears each include a shaft part extending from an end face of the gear wheel, the shaft part being supported so as to support the double gear like a cantilever.

According to a twelfth aspect, in any one of the first to eleventh aspects, an oil seal used in the rotary axis module includes at least one lip that has a minimum tension without suppressing a sealing function.

According to a thirteenth aspect, in any one of the first to twelfth aspects, the drive motor is mounted on a mounting surface of the output shaft flange such that a rotary axis of the drive motor is in parallel with the mounting surface.

A fourteenth aspect provides an articulated robot including at least one rotary axis module according to any one of the first to thirteenth aspects.

A detailed description about typical embodiments of the present invention shown in the accompanying drawings further clarifies the object, characteristics, advantages of the present invention and other objects, characteristics, and advantages of the present invention.

DETAILED DESCRIPTION

Embodiments of the present invention will be described below with reference to the accompanying drawings. In the following drawings, the same members will be indicated by the same reference symbols. For clear understanding, the scales of the drawings are optionally changed.

Figure 1A:
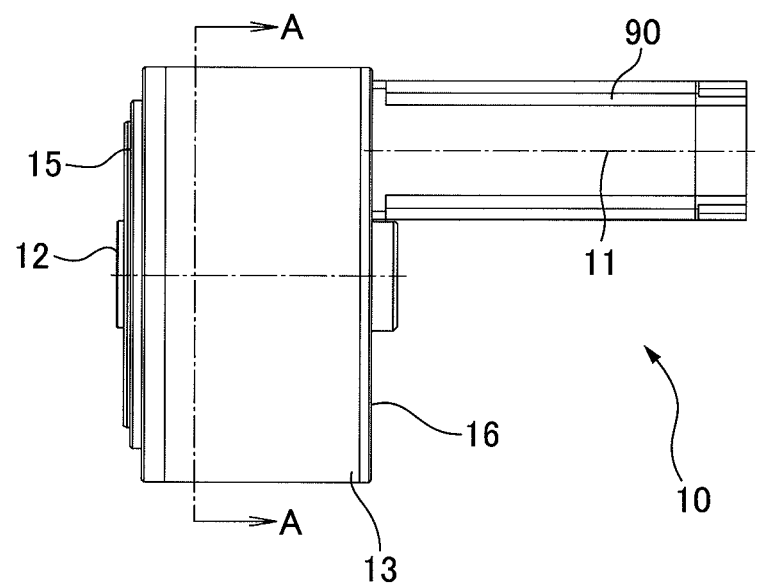
FIG. 1A is a side view showing a rotary axis module of the present invention.
Figure 1B:
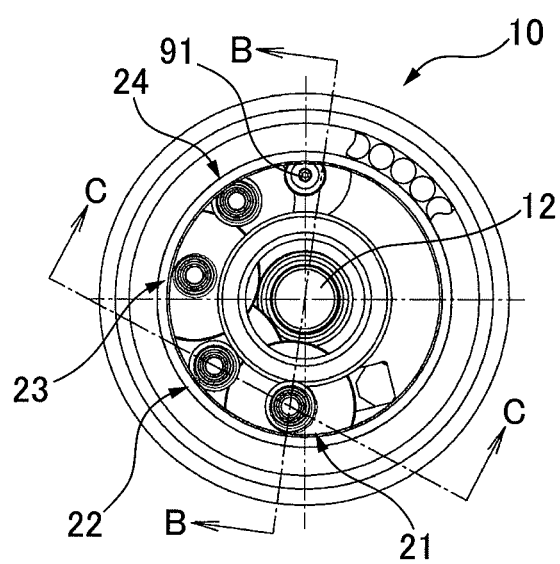
FIG. 1B is a cross-sectional view taken along line A-A of FIG. 1A.
Figure 1C:
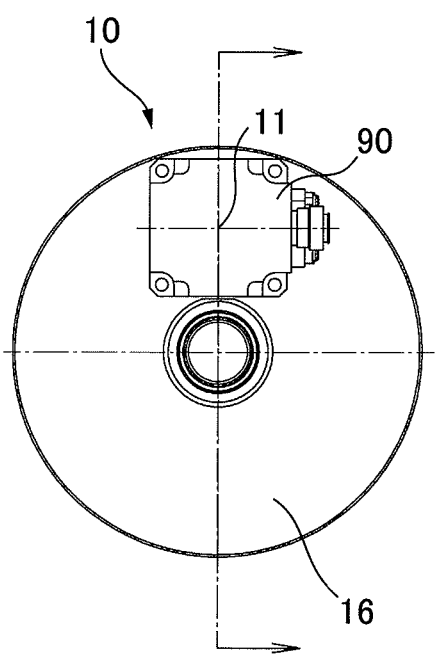
FIG. 1C is a side view of the rotary axis module shown in FIG. 1A.

FIG. 1A is a side view showing a rotary axis module of the present invention. FIG. 1B is a cross-sectional view taken along line A-A of FIG. 1A. FIG. 1C is an end view showing the rotary axis module of FIG. 1A.

As illustrated in these drawings, a rotary axis module 10 is substantially shaped like a cylinder covered with a reduction-drive outer case 13. The rotary axis module 10 may not be cylindrical. An input shaft 11 is disposed on one end face of the rotary axis module 10 while an output shaft 12 is disposed on the other end face of the rotary axis module 10.

The end face near the input shaft 11 serves as a mounting flange 16 on which a drive motor 90 is mounted. The drive motor 90 transmits a rotary force to the input shaft 11. Moreover, the end face near the output shaft 12 is configured as an output shaft flange 15 connected to the output shaft 12.

Figure 2:
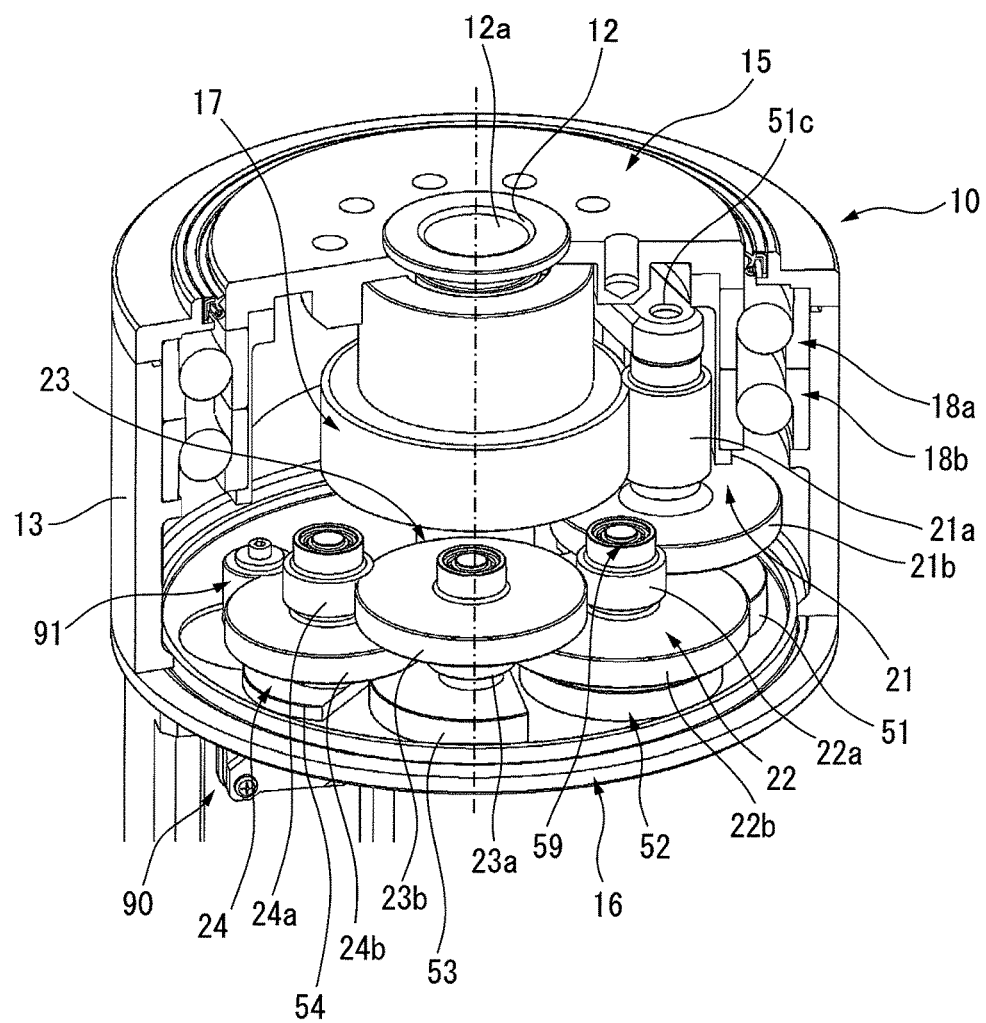
FIG. 2 is a partially exploded perspective view showing a rotary axis module according to a first embodiment of the present invention.
Figure 3A:
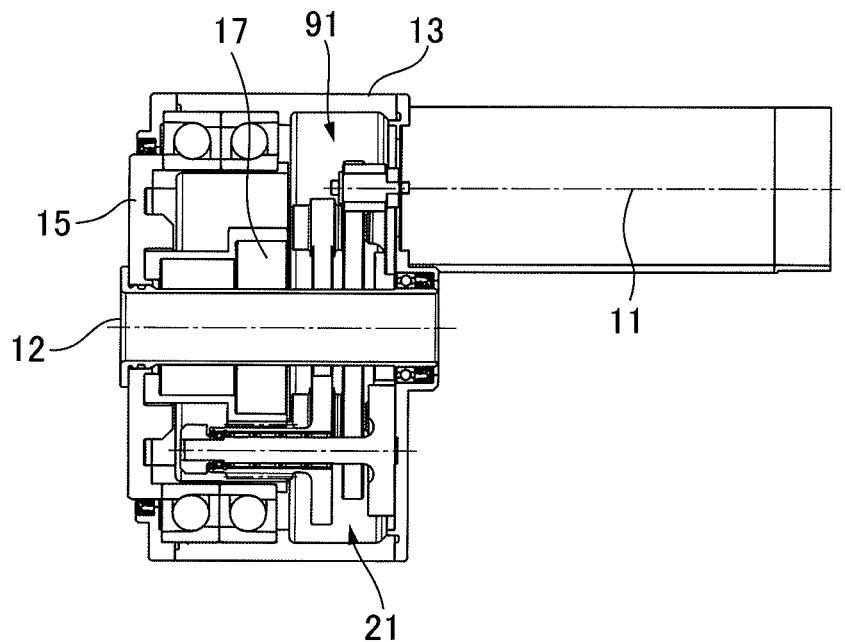
FIG. 3A is a cross-sectional view taken along line B-B of FIG. 1B.
Figure 3B:
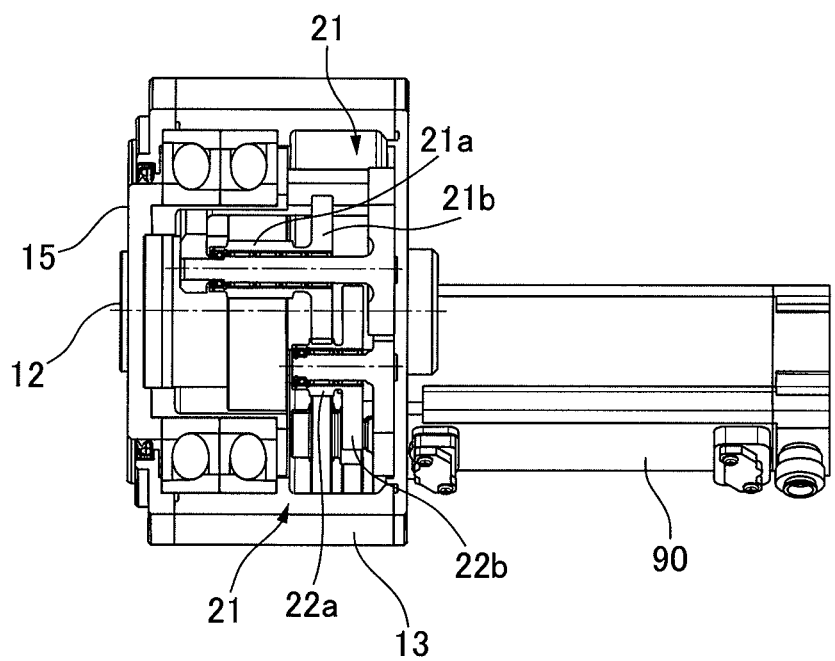
FIG. 3B is a cross-sectional view taken along line C-C of FIG. 1B.

FIG. 2 is a partially exploded perspective view showing a rotary axis module according to a first embodiment of the present invention. FIG. 3A is a cross-sectional view taken along line B-B of FIG. 1B. FIG. 3B is a cross-sectional view taken along line C-C of FIG. 1B. As shown in FIGS. 2 and 3A, an external gear 17 serving as a parallel gear is coupled to the output shaft flange 15. The external gear 17 is, for example, a spur gear or a helical gear.

Furthermore, a pinion 21a of a first double gear 21 is engaged with the external gear 17. As shown in FIGS. 2 and 3B, a pinion 22a of a second double gear 22 is engaged with a gear wheel 21b of the first double gear 21. Moreover, a pinion 23a of a third double gear 23 is engaged with a gear wheel 22b of the second double gear 22.

In addition, a pinion 24a of a fourth double gear 24 is engaged with a gear wheel 23b of the third double gear 23. Finally, a transfer gear 91 for transferring the power of the drive motor 90 is engaged with a gear wheel 24b of the fourth double gear 24. In FIG. 2, the gears are engaged with each other at five points, that is, the first to fourth double gears 21 to 24 and the transfer gear 91. Hence, a five-level speed reduction mechanism is shown in FIG. 2.

Figure 4:
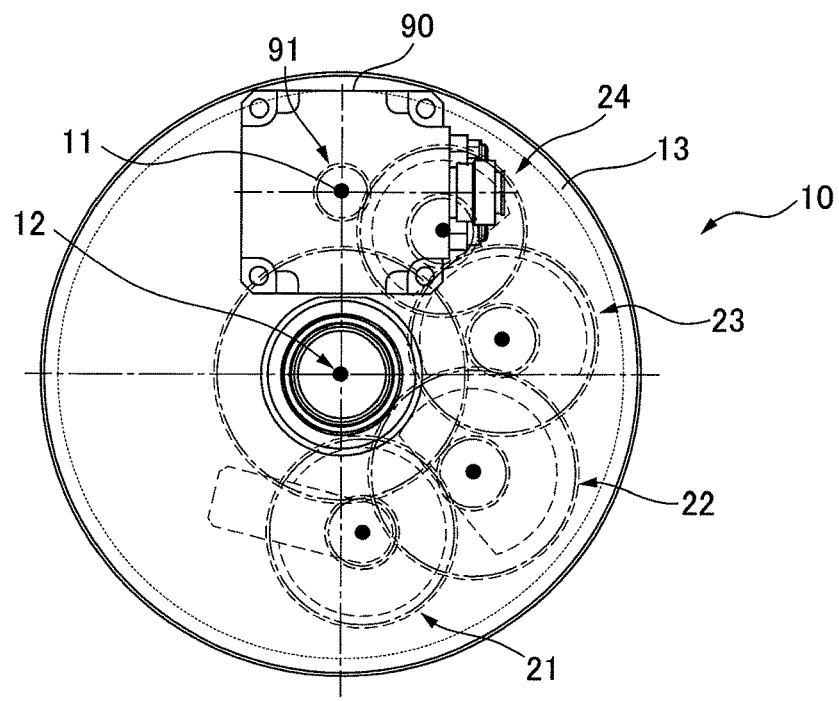
FIG. 4 is a partially transparent end view of the rotary axis module shown in FIG. 1A.

FIG. 4 is a partially transparent end view of the rotary axis module shown in FIG. 1A. Referring to FIGS. 1B and 4, a plurality of the double gears 21 to 24 and the transfer gear 91 are disposed in a space between the inner surface of the reduction-drive outer case 13 and the output shaft 12 so as to surround the output shaft 12. In other words, in the present invention, the double gears 21 to 24 and the transfer gear 91 are not linearly arranged. In the present invention, it is understood that the double gears 21 to 24 and the transfer gear 91 surround the output shaft 12 and thus a rotary axis module 10 can be reduced in size. The number of double gears may be an integer not smaller than 2.

Moreover, the rotary axis module 10 of the present invention only includes the double gears 21 to 24 and the external gear 17. These gears are parallel gears having high reverse efficiency. Thus, if the rotary axis module 10 is applied to a robot, particularly a human friendly robot as will be described later, an external force can be transmitted from the output arm to the input motor of the robot with higher efficiency.

For example, if a person collides with a robot, the force of collision is transmitted to an input motor with high sensitivity. The force is used to obtain the contact stop function of a human friendly robot with high sensitivity. For the same reason, a readthrough function is easily obtained that allows an operator to manually teach a teaching position to a robot.

Furthermore, an external force is easily transmitted to the input unit of the rotary axis module 10 and thus various sensors required for the contact stop function and the readthrough function may be reduced in number or may be replaced with inexpensive sensors having low resolutions. This proves that the rotary axis module 10 can be produced at lower cost than the related art.

As shown in FIG. 1B, the double gears 21 to 24 are not disposed in the right space of the reduction-drive outer case 13. Additional double gears may be disposed so as to eliminate the right extra space. In this case, the total reduction ratio of the rotary axis module 10 can be increased. Alternatively, the reduction-drive outer case 13 may be partially recessed to eliminate the extra space. This reduces the weight of the reduction-drive outer case 13 and the amount of lubrication oil contained in a reduction drive, thereby reducing the weight of the overall rotary axis module.

Referring to FIG. 2 again, the circumference of the output shaft flange 15 is coupled to the inner surface sides of large bearings 18a and 18b and the reduction-drive outer case 13 is coupled to the outer surface sides of the large bearings 18a and 18b. As described above, the external gear 17 is coupled around the center of the output shaft flange 15. Thus, the large bearings 18a and 18b receive a force applied from the outside to the output shaft 12 and a force applied from the pinion 21a of the first double gear 21.

The large bearings 18a and 18b are preferably angular back-to-back duplex bearings having relatively large sizes with small friction. Angular back-to-back duplex bearings used as the large bearings 18a and 18b can simultaneously receive a moment applied to the output shaft 12 and a radial load applied to the parallel-axis spur gear 17. Furthermore, this can minimize a reduction in the transmission efficiency of an external force from the output shaft to the input shaft. In addition, the angular back-to-back duplex bearings are assembled into the rotary axis module 10 as they are, advantageously eliminating the need for a preload adjustment in the manufacturing of the rotary axis module 10.

Figure 5:
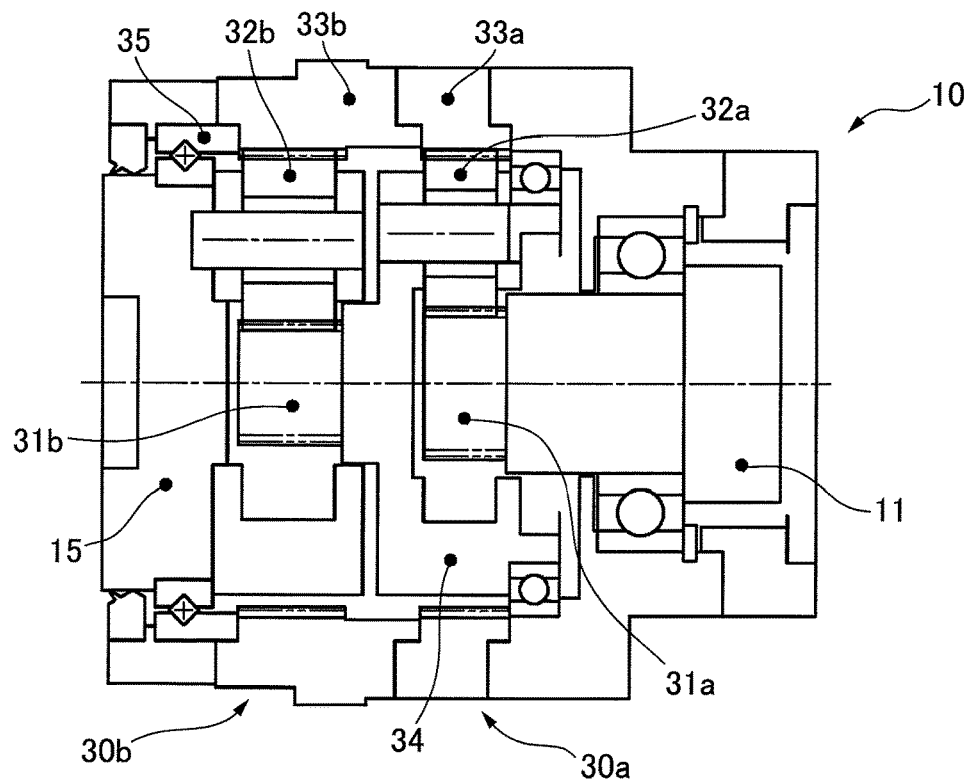
FIG. 5 is a cross-sectional view showing a rotary axis module including a planet gear reduction drive.

FIG. 5 is a cross-sectional view showing a rotary axis module including a planet gear reduction drive. The rotary axis module shown in FIG. 5 includes a first planet-gear speed reduction mechanism 30*a* and a second planet-gear speed reduction mechanism 30*b*. The planet gear reduction mechanisms 30*a* and 30*b* respectively include sun gears 31*a* and 31*b*, internal gears 33*a* and 33*b*, and planet gears 32*a* and 32*b* engaged with the sun gears 31*a* and 31*b* and the internal gears 33*a* and 33*b*.

In FIG. 5, the sun gear 31*a* of the planet gear reduction mechanism 30*a* is combined with the input shaft 11. The output of the planet gear reduction mechanism 30*a* is transmitted to the sun gear 31*b* of the second planet-gear speed reduction mechanism 30*b* through a carrier 34. Moreover, a cross roller bearing 35 is disposed between the internal gear 33*b* and the output shaft flange 15.

Generally, a single-stage planet gear reduction mechanism can transmit a large force but cannot obtain a large reduction ratio. Thus, a planet gear reduction mechanism having at least three stages is necessary for obtaining the same reduction ratio as the rotary axis module 10 configured as shown in FIG. 2. Consequently, the rotary axis module including the planet gear reduction mechanism is axially extended. In contrast, the rotary axis module 10 in FIG. 2 can be axially shorter than the rotary axis module including the planet gear reduction mechanism.

Furthermore, the planet gears rotate about the sun gear in the planet gear reduction mechanism, leading to great difficulty in backlash adjustment, whereas in the rotary axis module 10 of FIG. 2, a backlash can be adjusted only by adjusting the position of specific double gears.

For example, only the positions of the first double gear 21, the third double gear 23, and the fourth double gear 24 may be adjusted in FIG. 4. The fourth double gear 24 is adjacent to the drive motor 90 so as to reduce the influence of a backlash according to a total reduction ratio between the third double gear 23 and the first double gear 21. Thus, an adjustment of the fourth double gear 24 may be omitted. It is understood that the rotary axis module 10 in FIG. 2 remarkably facilitates backlash adjustment.

Figure 6:
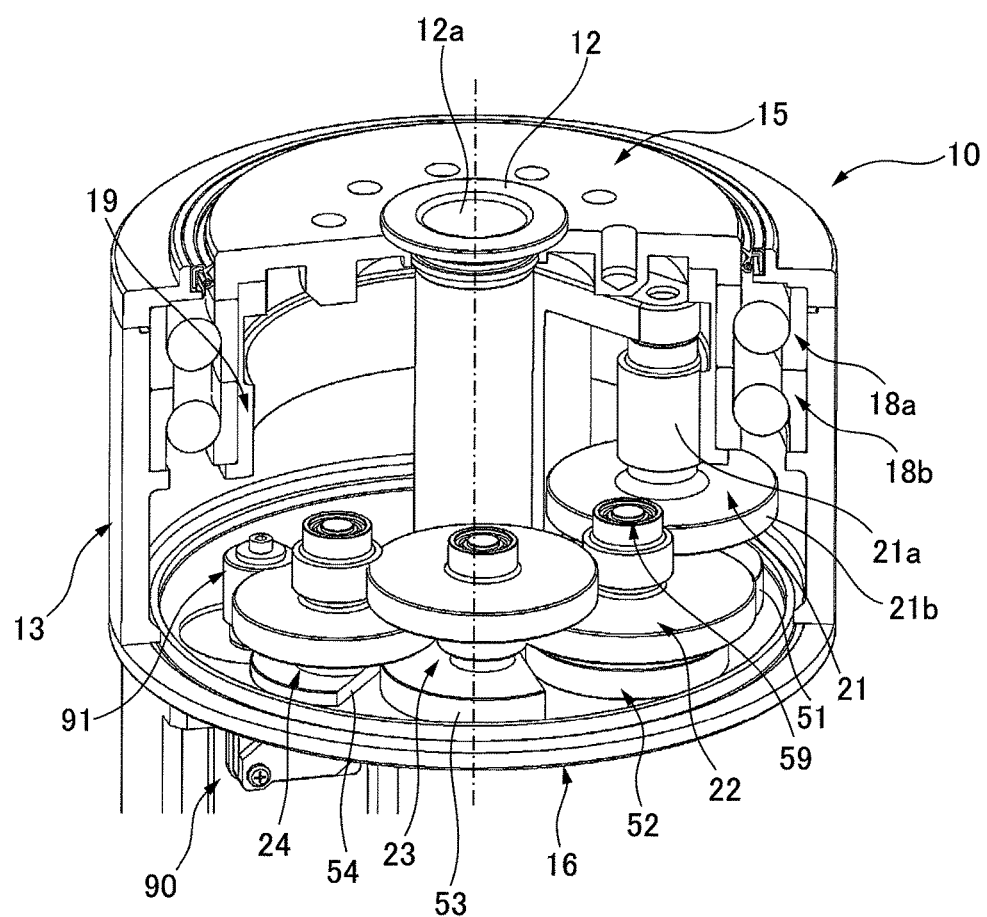
FIG. 6 is a partially exploded perspective view showing a rotary axis module according to a second embodiment of the present invention.

FIG. 6 is a partially exploded perspective view showing a rotary axis module according to a second embodiment of the present invention. As shown in FIG. 6, an internal gear 19 serving as a parallel gear is coupled to an output shaft flange 15. The internal gear 19 is, for example, a spur gear or a helical gear. In FIG. 6, a pinion 21*a* of a first double gear 21 is engaged with the internal gear 19 coupled to the output shaft flange 15. Other configurations are substantially identical to the configurations described with reference to FIG. 2 and thus the explanation thereof is omitted.

When compared with the rotary axis module 10 including the external gear 17 shown in FIG. 2, a rotary axis module 10 shown in FIG. 6 can further increase a reduction ratio between the internal gear 19 and the pinion 21*a* of the first double gear 21.

In FIGS. 2 and 6, a hollow 12*a* for passage of linear members, e.g., driving cables and air tubes is formed at the center of an output shaft 12. Thus, when the rotary axis module 10 is mounted in a robot arm, umbilical members can be easily stored in the robot arm so as not to be exposed to the outside.

The hollow 12*a* preferably includes a pipe member penetrating the rotary axis module 10. In this case, an O-ring is preferably disposed between the pipe member and an output shaft flange 15. In addition, an oil seal and a ball bearing are preferably provided between the pipe member and a mounting flange 16. Thus, the pipe member can be supported in a sealed state.

Figure 7A:
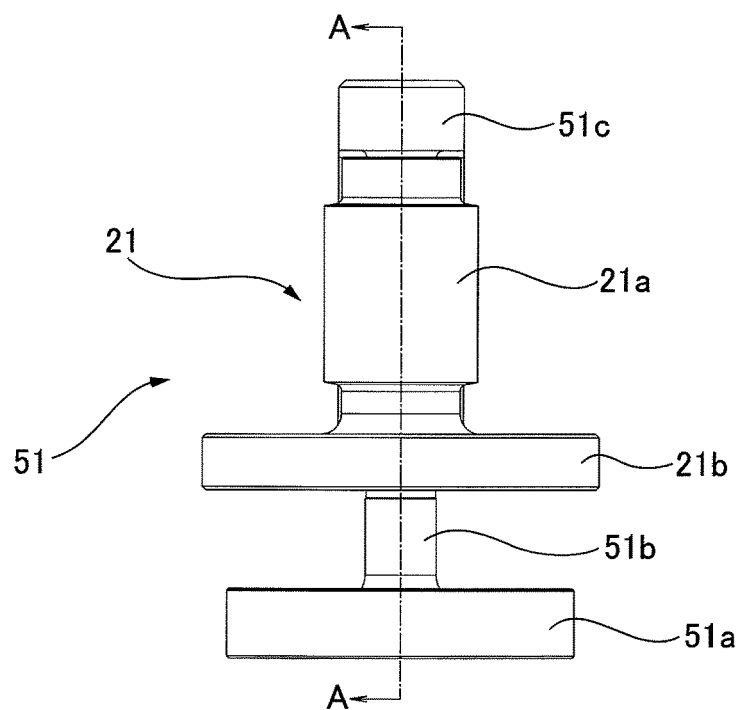
FIG. 7A is a front view of a double gear.
Figure 7B:
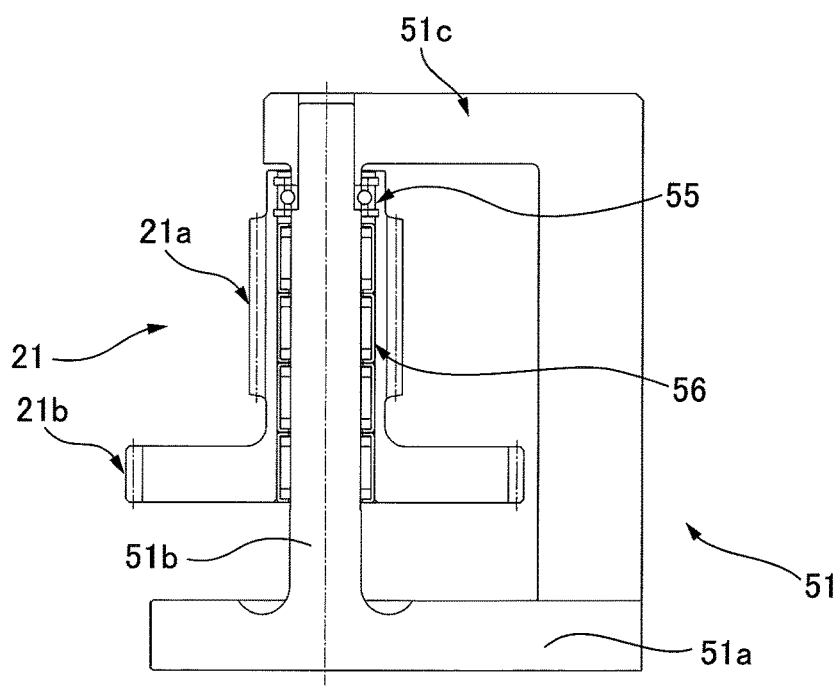
FIG. 7B is a cross-sectional view of the double gear.

FIG. 7A is a front view of a double gear. FIG. 7B is a cross-sectional view of the double gear. In these drawings, for example, a first double gear 21 is illustrated. However, other double gears 22 to 24 may have substantially similar configurations.

As shown in FIGS. 7A and 7B, a gear support part 51 mainly includes a base 51*a*, a support member 51*b* vertically extending from the base 51*a*, and an arm member 51*c* that is extended from the base 51*a* and is engaged with the distal end of the support member 51*b*. The first double gear 21 is rotatably inserted onto the support member 51*b*.

Generally, a falling moment is applied to the support member of a double gear. A large falling moment is applied to, in particular, the support member 51*b* of the first double gear 21 engaged with the parallel gear 17 of the output shaft 12. In the configuration shown in FIGS. 7A and 7B, however, both ends of the double gear 21 are supported and thus the support member 51*b* can stably support the double gear 21 even if a large falling moment is applied. This can also increase the reduction ratio of the double gear 21.

In this way, both ends of the support member 51*b* are supported by the base 51*a* and the arm member 51*c* and thus the support member 51*b* hardly inclines. As is evident from FIG. 2 and so on, the gear support part 51 is stored in the reduction-drive outer case 13 so as not to interfere with the output shaft flange 15 and the external gear 17 or the internal gear 19 that is coupled to the output shaft flange 15. Moreover, as shown in FIG. 2 and so on, the base 51*a* is mounted on a mounting flange 16 of the rotary axis module 10.

As shown in FIG. 7B, a needle bearing 56 is disposed between the first double gear 21 and the support member 51*b*. The needle bearing 56 can radially bear a load, thereby reducing the diameter of the pinion 21*a* and increasing a reduction ratio per each point of engagement. Thus, the reduction ratio of the double gear can be increased.

When the rotary axis module 10 is swung, a force is applied so as to axially move the double gear 21 and so on. However, the gear support part 51 may be broken by such a force.

In the present invention, as shown in FIG. 7B, a ball bearing 55, for example, a deep groove ball bearing is disposed on the pinion 21*a* of the first double gear 21. The ball bearing 55 can bear, for example, a thrust load caused by weight applied to the double gear, thereby bearing a force that axially moves the double gear 21. Thus, even when the rotary axis module 10 is swung, damage to the gear support part 51 can be prevented. In this case, a clearance is always formed between the outer cylindrical surface of the ball bearing 55 and the inner mating cylindrical surface of the pinion 21, allowing the ball bearing 55 to receive only a thrust load without directly receiving a radial load applied to the pinion 21*a*.

Figure 8A:
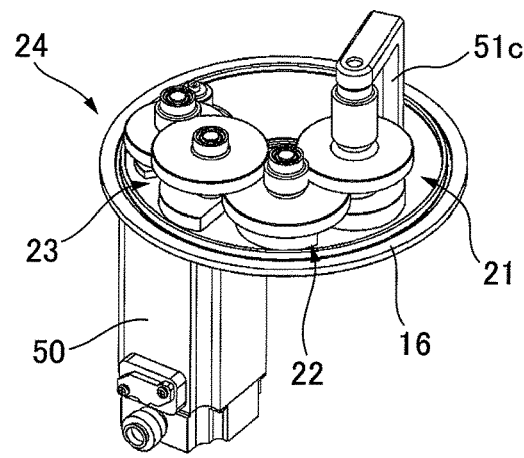
FIG. 8A is a first partial perspective view of the rotary axis module.
Figure 8B:
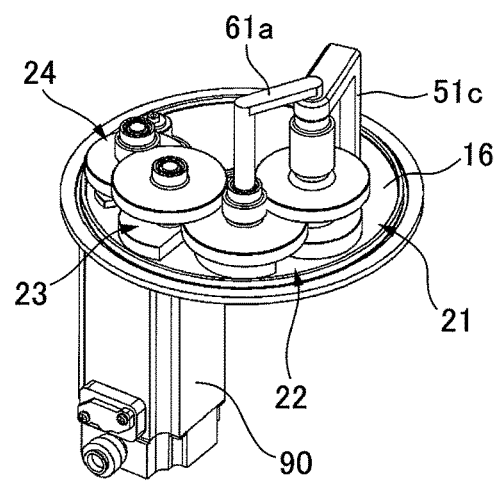
FIG. 8B is a second partial perspective view of the rotary axis module.
Figure 8C:
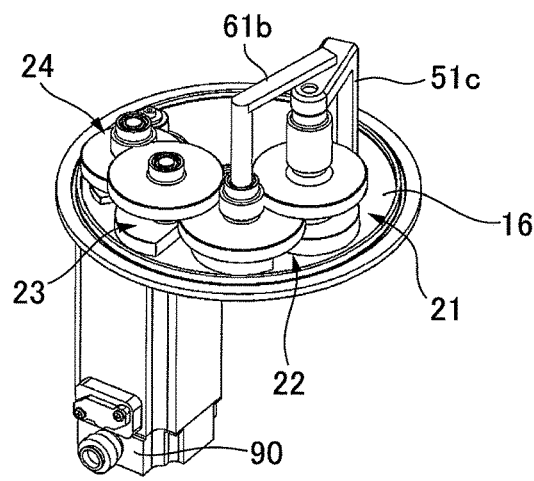
FIG. 8C is a third partial perspective view of the rotary axis module.

FIGS. 8A to 8C are partial perspective views of the rotary axis module 10. In these drawings, the reduction-drive outer case 13, the output shaft flange 15, the large bearings 18*a* and 18*b*, the parallel gears 17 and 19 and so on are omitted to facilitate understanding.

FIG. 8A corresponds to a part of the rotary axis module 10 shown in FIG. 2. In FIG. 8B, the support member 51*b* of the first double gear 21 and the support member 51*b* of the second double gear 22 are connected to each other via a reinforcing member 61*a*, e.g., a beam member. In FIG. 8C, the arm member 51*c* of the first double gear 21 and the support member 51b of the second double gear 22 are connected to each other via a reinforcing member 61b.

As described above, the support members 51b of the two adjacent double gears are connected to each other via the reinforcing member 61a. This can further reinforce the support member 51b of the first double gear 21 and the support member 51b of the second double gear 22. The reinforcing member 61a is preferably mounted after the backlash adjustment of the double gears 21 and 22.

Alternatively, another two double gears may be connected to each other via a reinforcing member or three or more double gears may be connected to one another via a single reinforcing member, which is not illustrated. Moreover, two double gears that are not adjacent to each other, for example, the second double gear 22 and the fourth double gear 24 may be connected to each other via a reinforcing member within the scope of the present invention.

Figure 9A:
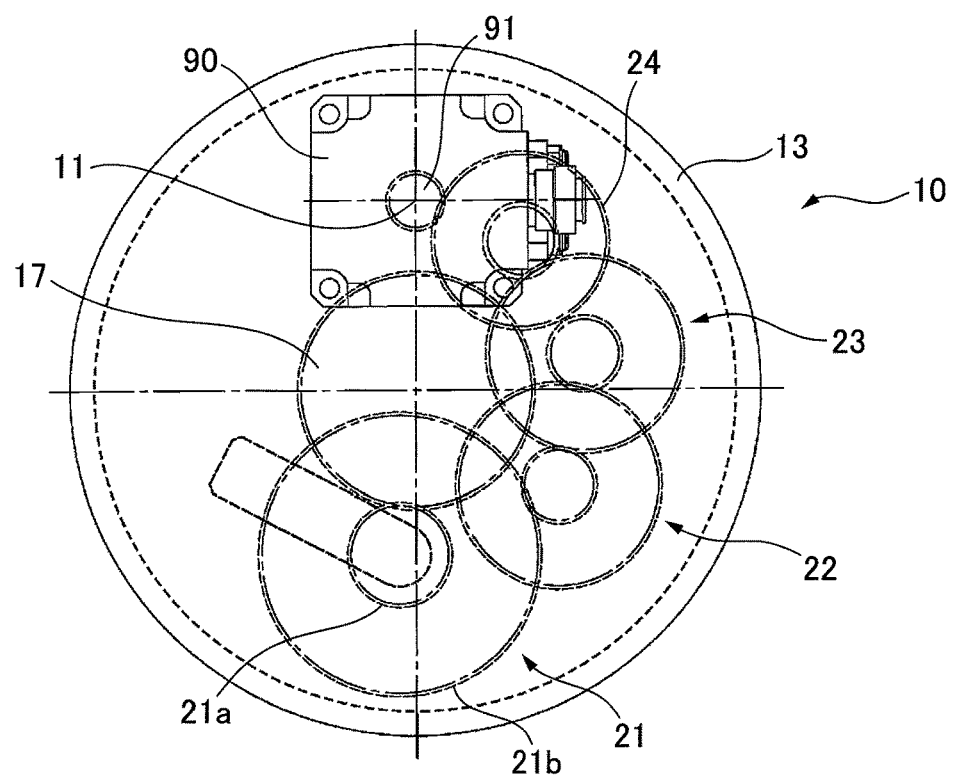
FIG. 9A is a partially transparent end view of the rotary axis module.
Figure 9B:
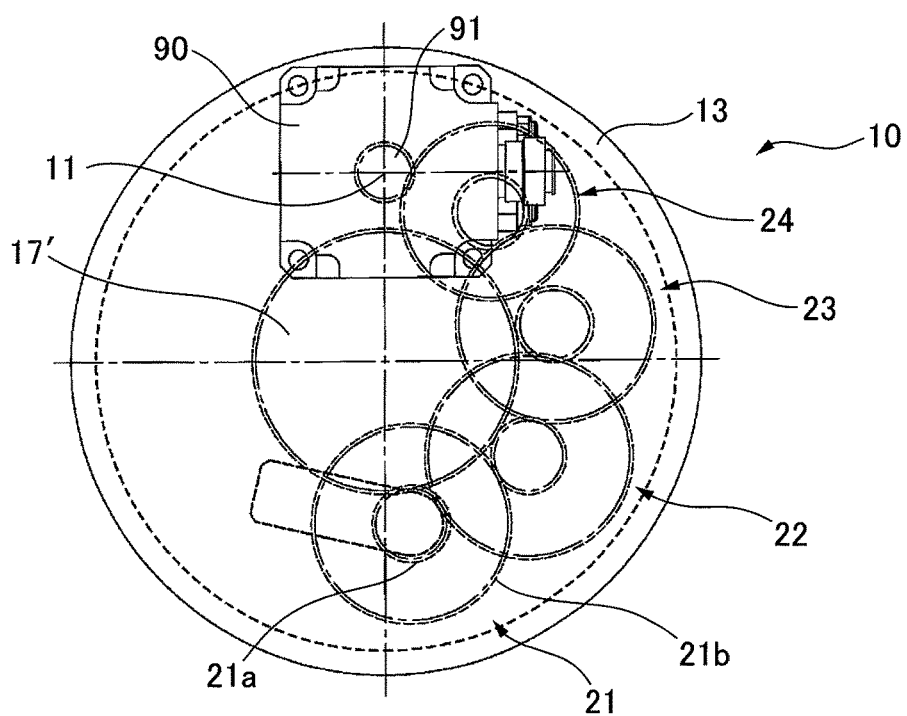
FIG. 9B is another partially transparent end view of the rotary axis module.

FIGS. 9A and 9B are partially transparent end view of the rotary axis module. In FIG. 9A, the parallel gear 17 has a relatively small number of teeth, whereas the pinion 21a of the first double gear 21 has a relatively large number of teeth. In FIG. 9B, a parallel gear 17' has a relatively large number of teeth, whereas the pinion 21a of the first double gear 21 has a relatively small number of teeth.

In this regard, it is assumed that the total reduction ratio of the configuration in FIG. 9A is equal to the total reduction ratio of the configuration in FIG. 9B. In FIG. 9A, a small reduction ratio is obtained at the fifth stage, that is, the first double gear 21. Thus, in the configuration of FIG. 9A, a large reduction ratio is necessary between the second double gear 22 and the fourth double gear 24.

Regarding this point, a diameter difference needs to be increased between the pinion and the gear wheel of the double gear of the final stage in a plurality of successive double gears. This is because a reduction ratio cannot be obtained at the double gear of the previous stage of the final stage. Thus, a reduction ratio needs to be obtained between the gear wheel 21b of the first double gear 21 and the pinion 22a of the second double gear 22 in FIG. 9A. For this reason, in the configuration of FIG. 9A, the reduction-drive outer case 13 needs to be increased in size, thereby upsizing the rotary axis module 10.

In contrast, in the configuration of FIG. 9B, the parallel gear 17' has a larger number of teeth than the parallel gear 17. A reduction ratio between the parallel gear 17' and the pinion 21a of the first double gear 21 is larger than a reduction ratio between the gear wheel 21b of the first double gear 21 and the pinion 22a of the second double gear 22. In other words, in the configuration of FIG. 9B, the gear wheel 21b of the first double gear 21 has a relatively small diameter, thereby reducing the size of the reduction-drive outer case 13.

Figure 10:
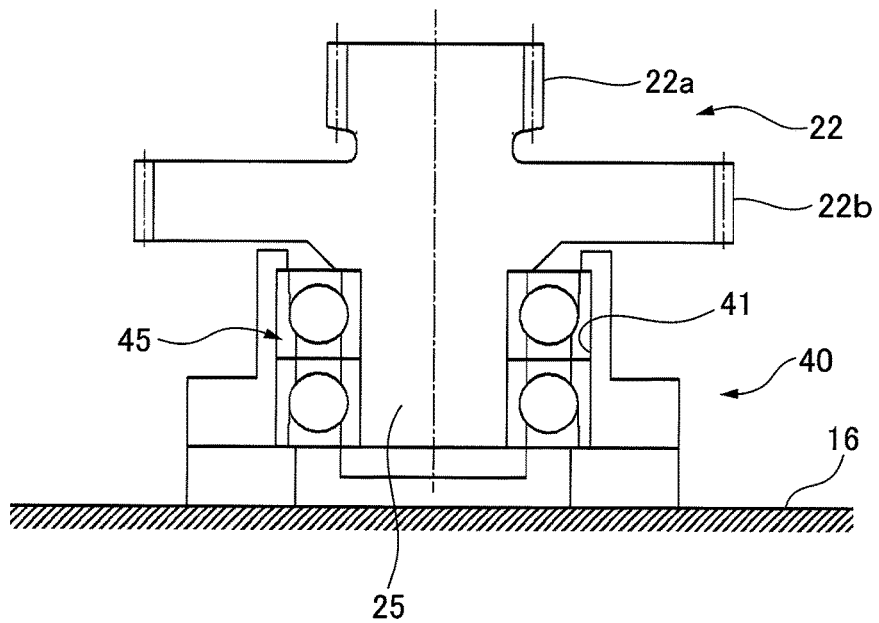
FIG. 10 is a cross-sectional view of the double gear.

FIG. 10 is a cross-sectional view of the double gear. In FIG. 10, for example, the second double gear 22 is illustrated. However, other double gears 21, 23, and 24 may have substantially similar configurations.

In FIG. 10, a shaft part 25 is extended from the center of the outer end face of the gear wheel 22b so as to stand upright with respect to the outer end face. Moreover, a support base 40 having a recessed part 41 on the top surface is mounted on the mounting flange 16. As shown in FIG. 10, the shaft part 25 of the second double gear 22 is inserted into the recessed part 41 so as to rotate on the top surface of the support base 40 through a bearing 45. Thus, in the configuration of FIG. 10, the second double gear 22 is supported like a cantilever.

In this configuration, bearings near the pinion 22a can be eliminated and thus the pinion 22a can have a smaller diameter than in the configuration of FIG. 7B where the needle bearing 56 is disposed. Furthermore, a reduction ratio per each point of engagement can be further increased. The bearing 45 that supports the shaft part 25 preferably has a relatively large moment capacity. For example, the bearing 45 is preferably an angular back-to-back duplex bearing.

Figure 11A:
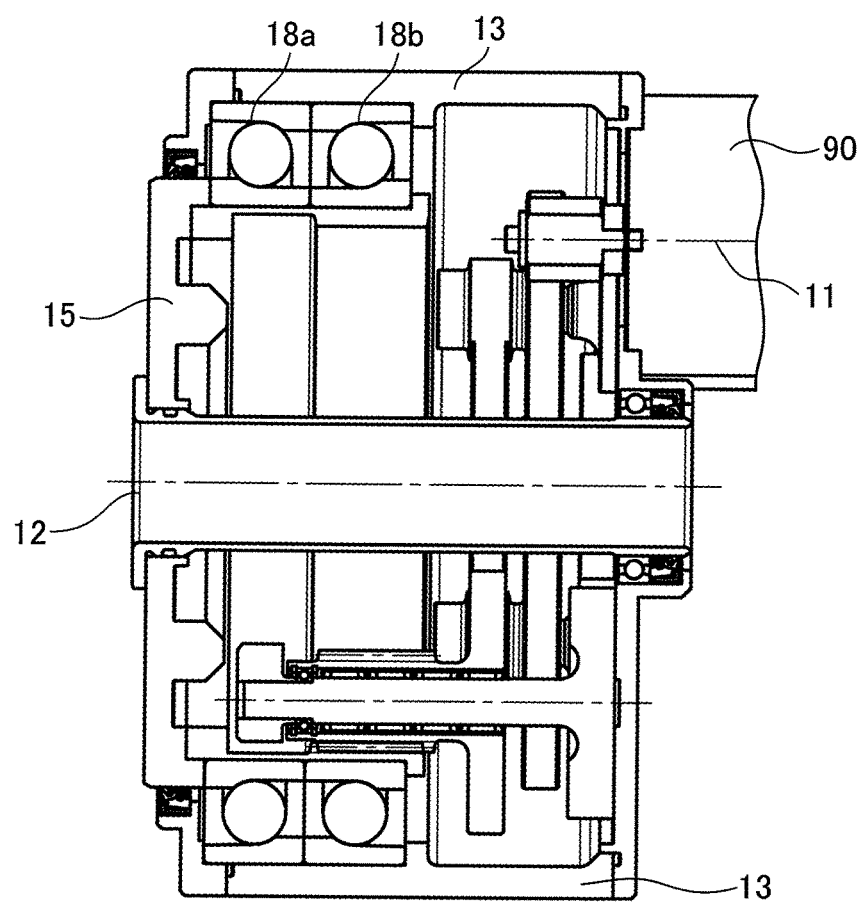
FIG. 11A is a partial cross-sectional view of the rotary axis module.
Figure 11B:
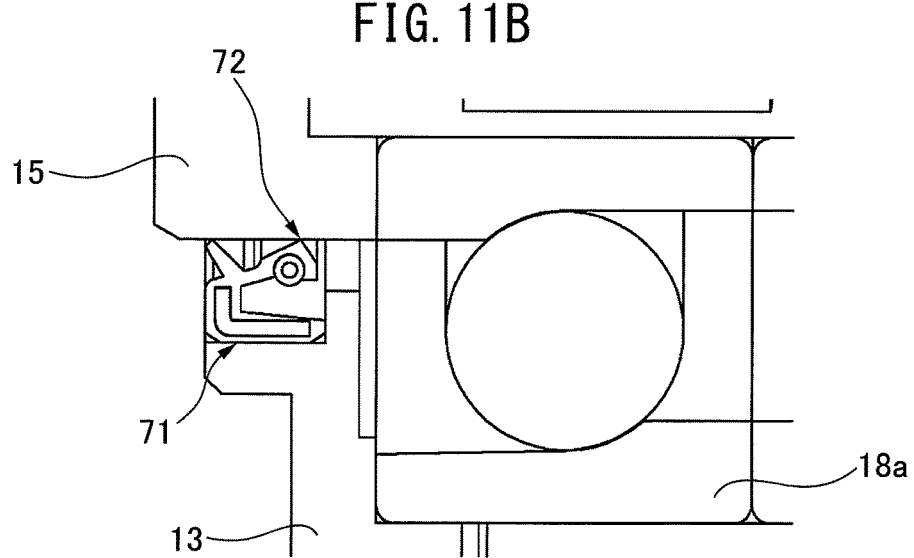
FIG. 11B is a partially enlarged view showing a part of FIG. 11A.

FIG. 11A is a partial cross-sectional view of the rotary axis module. FIG. 11B is a partially enlarged view of FIG. 11A. As shown in FIG. 11B, a seal member is disposed between the reduction-drive outer case 13 and the output shaft flange 15. The seal member is an oil seal 71 that may include at least one main lip 72. As shown in FIG. 11B, the main lip 72 is in contact with the output shaft flange 15 with a small contact surface.

Generally, the rolling friction of the oil seal may reduce the transmission efficiency of an external force from the output shaft to the input shaft. Thus, in the present invention, the main lip 72 is used that has a minimum tension without suppressing the sealing function. This can minimize the rolling friction, leading to a minimum friction loss. Thus, it is understood that the transmission efficiency can be further increased. Such a low-tension oil seal is desirably applied to all oil seals used in the rotary axis module.

Figure 12:
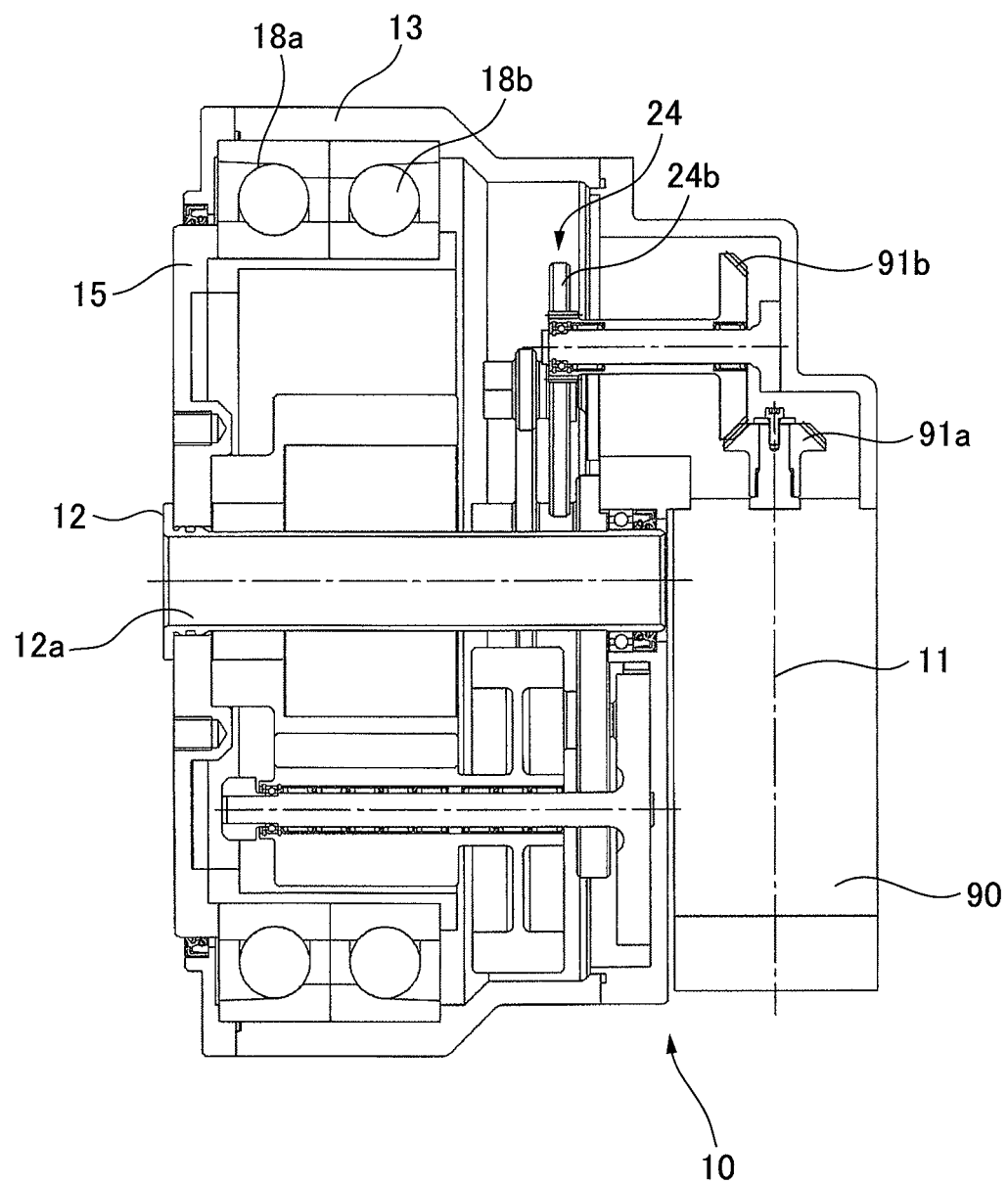
FIG. 12 is a cross-sectional view showing a rotary axis module according to another embodiment of the present invention.

FIG. 12 is a cross-sectional view showing a rotary axis module according to another embodiment of the present invention. In FIG. 12, the axis of a drive motor 90 is perpendicular to the central axis (output axis) of a rotary axis module 10. A first bevel gear 91a is mounted on the output shaft of the drive motor 90 and is engaged with a second bevel gear 91b. Moreover, the second bevel gear 91b is engaged with a gear wheel 24b of a fourth double gear 24. In other words, in the configuration of FIG. 12, the first bevel gear 91a and the second bevel gear 91b form a transfer gear 91.

In this case, the drive motor 90 is disposed such that the rotary axis of the drive motor 90 is in parallel with an output shaft flange 15, thereby shortening the rotary axis module 10 in the direction of the output shaft. In FIG. 12, the drive motor 90 needs to be disposed near one end of a hollow 12a so as to keep the opening of the hollow 12a.

Figure 13:
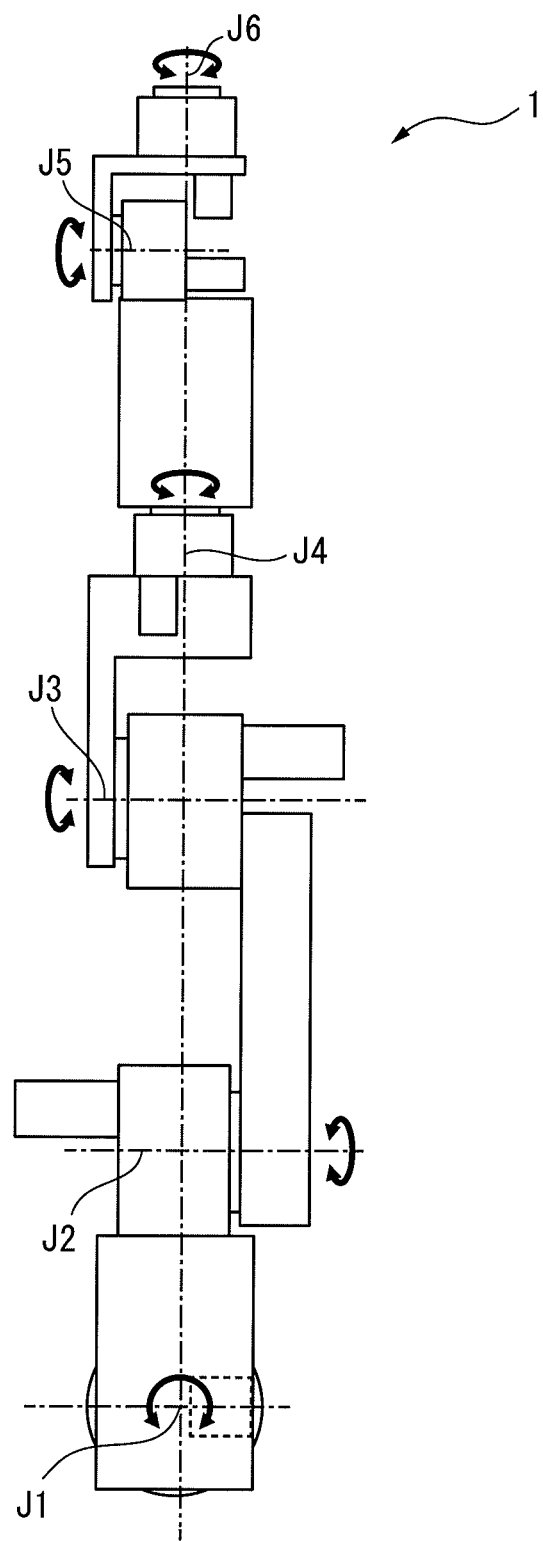
FIG. 13 shows a robot including the rotary axis module of the present invention.

FIG. 13 shows a robot including the rotary axis module of the present invention. The robot 1 in FIG. 13 is a six-axis vertical articulated robot including six joint axes J1 to J6. The joint axes are driven by the rotary axis module 10 or a rotary axis module 10'.

An arm of the robot 1 includes multiple arm parts. The rotary axis modules 10 and 10' are disposed between the two adjacent arm parts. The robot 1 shown in FIG. 13 includes the three rotary axis modules 10 and the three rotary axis modules 10' smaller than the rotary axis modules 10.

The robot 1 includes the rotary axis modules 10 and 10' and the arm parts and thus can be easily reassembled when a user changes the purpose of use. This also advantageously facilitates automatic manufacturing for a manufacturer of the robot 1.

All the axes of the robot may include identical rotary axis modules. Typically, arms are lightweight on the axes of the distal ends of the robot 1 and thus the rotary axis modules 10 do not need to be identical in the overall robot 1. In the present invention, the three rotary axis modules 10 are disposed on the proximal ends of the robot 1, whereas the three rotary axis modules 10' are disposed on the distal ends of the robot 1. In other words, the compact rotary axis modules 10' are used on the distal ends of the robot 1.

Thus, the weight of the overall arm and the cost can be reduced as compared with the use of identical rotary axis modules on all the axes. If the mounting interface of the rotary axis module is shared by all the axes, the arms are lightweight on the axes of the distal ends of the robot 1, thereby reducing a load applied to a movable member. Thus, the number of bolts for fixing the rotary axis modules 10 and 10' may be reduced.

Effects of Aspects

According to a first aspect, at least two double gears and a transfer gear are disposed so as to surround the output shaft, thereby reducing the size of a rotary axis module. Moreover, the rotary axis module only includes parallel gears having high reverse efficiency, thereby improving the transmission efficiency of an external force from an output arm to an input motor.

According to a second aspect, the double gears can be stably fixed on a mounting flange.

According to a third aspect, umbilical members, e.g., driving cables and air tubes can be inserted into a hollow. Thus, when the rotary axis module is mounted in a robot arm, umbilical members can be easily stored in the robot arm so as not to be exposed to the outside.

According to a fourth aspect, if the parallel gear is an internal gear, a larger reduction ratio can be obtained than an external gear serving as the parallel gear.

According to a fifth aspect, in the case of an angular back-to-back duplex bearing, the bearing can simultaneously receive a moment applied to the output shaft and a radial load applied to a parallel-axis spur gear.

According to a sixth aspect, both ends of the double gear are supported and thus a support member can stably support the double gear even if a large falling moment is applied. This can also increase the reduction ratio of the double gear.

According to a seventh aspect, the support members of the adjacent double gears are reinforced by a reinforcing member, e.g., a beam member that connects the double gears, achieving a structure with higher resistance to inclination.

According to an eighth aspect, a bearing for supporting the pinion of the double gear is a needle bearing, thereby reducing the diameter of the pinion. This can increase the reduction ratio of the double gear.

According to a ninth aspect, if a ball bearing, e.g., a deep groove ball bearing is used, the ball bearing can bear a small thrust load, for example, a thrust load caused by weight applied to the double gear.

According to a tenth aspect, assuming that the same total reduction ratio is obtained in the overall configuration, the gear wheel of one of the double gears has a relatively small diameter, thereby reducing the size of a reduction-drive outer case.

According to an eleventh aspect, a shaft part extending from the end face of the double gear is supported like a cantilever by the bearing, thereby further downsizing the pinion of the double gear. Thus, a reduction ratio at a point of engagement can be further increased.

The rolling friction of the oil seal may reduce the transmission efficiency of an external force from the output shaft to an input shaft. According to a twelfth aspect, a lip is used that has a minimum tension without suppressing a sealing function. This can minimize the rolling friction, leading to a minimum friction loss. Thus, the transmission efficiency can be further increased.

According to a thirteenth aspect, a drive motor is disposed such that the rotary axis of the drive motor is in parallel with the mounting surface of an output shaft flange, thereby shortening the rotary axis module in the direction of the output shaft.

According to a fourteenth aspect, the rotary axis module and link members are combined so as to easily form articulated robots in various forms.

The present invention was described according to the typical embodiments. A person skilled in the art could understand that the embodiments can be changed and various other changes, omissions, and additions may be made without departing from the scope of the present invention.

What is claimed is:

1. A rotary axis module comprising:
   an input shaft connected to a drive motor;
   an output shaft;
   an output shaft flange connected to the output shaft;
   a parallel gear coupled to the output shaft flange;
   a reduction-drive outer case rotatably supported by the output shaft flange;
   a double gear train including at least two double gears disposed in the reduction-drive outer case; and
   a transfer gear that transmits power of the drive motor to the double gear train,
   wherein the parallel gear is engaged with a pinion of one of the at least two double gears while a gear wheel of the other double gear of the at least two double gears is engaged with the transfer gear,
   the at least two double gears and the transfer gear are disposed in a space between an inner surface of the reduction-drive outer case and the output shaft so as to surround the output shaft, and
   the rotary axis module further comprises bearings which are disposed in a space between the reduction-drive outer case and the output shaft flange, wherein inner surface sides of the bearings are coupled to the output shaft flange and outer surface sides of the bearings are coupled to the reduction-drive outer case, and the bearings receive a force externally acting on the output shaft and a force from the pinion of the one of the at least two double gears.

2. The rotary axis module according to claim 1, wherein the at least two double gears are each supported by support bearings and a support member, and the support member is fixed to a mounting flange where the drive motor is mounted.

3. The rotary axis module according to claim 1, wherein the output shaft has a hollow for passage of an umbilical member.

4. The rotary axis module according to claim 1, wherein the parallel gear is an internal gear.

5. The rotary axis module according to claim 1, wherein the bearings are angular back-to-back duplex bearings.

6. The rotary axis module according to claim 2, wherein at least one of the support members of the double gears is supported by both of the pinion and the gear wheel.

7. The rotary axis module according to claim 2, wherein the support members of the at least two double gears are connected to each other via a reinforcing member.

8. The rotary axis module according to claim 2, wherein at least one of the support bearings of the at least two double gears includes a needle bearing.

9. The rotary axis module according to claim 2, wherein at least one of the support bearings of the at least two double gears includes a ball bearing.

10. The rotary axis module according to claim 1, wherein a reduction ratio between the parallel gear and the pinion of one of the double gears is larger than a reduction ratio between the gear wheel of one of the double gears and the pinion of the other double gear.

11. The rotary axis module according to claim 1, wherein the at least two double gears each include a shaft part extending from an end face of the gear wheel, the shaft part being supported so as to support the double gear like a cantilever.

12. The rotary axis module according to claim 1, wherein an oil seal used in the rotary axis module includes at least one lip that has a minimum tension without suppressing a sealing function.

13. The rotary axis module according to claim 1, wherein the drive motor is mounted on a mounting surface of the output shaft flange such that a rotary axis of the drive motor is in parallel with the mounting surface.

14. An articulated robot comprising at least one rotary axis module according to claim 1.

* * * * *